US010043530B1

(12) United States Patent
Shi et al.

(10) Patent No.: US 10,043,530 B1
(45) Date of Patent: Aug. 7, 2018

(54) METHOD AND AUDIO NOISE SUPPRESSOR USING NONLINEAR GAIN SMOOTHING FOR REDUCED MUSICAL ARTIFACTS

(71) Applicant: OmniVision Technologies, Inc., Santa Clara, CA (US)

(72) Inventors: Dong Shi, Singapore (SG); Chung-An Wang, Singapore (SG)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 15/892,202

(22) Filed: Feb. 8, 2018

(51) Int. Cl.

| | |
|---|---|
| ***H04B 15/00*** | (2006.01) |
| ***G10L 21/0232*** | (2013.01) |
| ***G10L 21/0316*** | (2013.01) |
| ***G10L 21/0272*** | (2013.01) |
| ***H04R 3/04*** | (2006.01) |

(52) U.S. Cl.
CPC ...... *G10L 21/0232* (2013.01); *G10L 21/0272* (2013.01); *G10L 21/0316* (2013.01); *H04R 3/04* (2013.01)

(58) Field of Classification Search
CPC ...................................................... H04B 15/00
See application file for complete search history.

(56) References Cited

U.S. PATENT DOCUMENTS

2009/0281800 A1 11/2009 LeBlanc et al.
2010/0104113 A1* 4/2010 Liu .................... G10L 21/0208 381/94.2
2010/0207689 A1* 8/2010 Shimada ............ G10L 21/0208 327/551
2011/0081026 A1* 4/2011 Ramakrishnan .... G10L 21/0208 381/94.3
2011/0235553 A1* 9/2011 Andersson ........... H04B 1/0475 370/277
2013/0013304 A1 1/2013 Murthy et al.
2014/0316775 A1 10/2014 Furuta
2015/0127331 A1 5/2015 Lamy et al.
2016/0066087 A1* 3/2016 Solbach ................. H04R 3/005 381/71.1

(Continued)

OTHER PUBLICATIONS

Notice of Allowance in U.S. Appl. No. 15/892,219 dated May 25, 2018, 6 pp.

*Primary Examiner* — Olisa Anwah
(74) *Attorney, Agent, or Firm* — Lathrop Gage LLP

(57) ABSTRACT

A noise suppressor has a band extractor to separate signal by frequency band; and per-band units for each of band including noise estimator and SNR computation units. The per-band unit has a histogrammer to give histograms of current and past SNRs, and a gain-curve updater computes gain curves from the histogram. Gain curves are used to determine raw gains from current SNRs, raw gain is filtered and controls a variable gain unit to provide band-specific gain-adjusted, signals that are recombined into a noise-reduced frequency-domain output. Raw gain filtering may include finite-impulse-response filtering and weighted averaging of intermediate gains of a current and adjacent-band per-band unit. The method includes separating an input into frequency bands, estimating in-band noise, and deriving a band SNR. Then, histogramming the SNR and updating a gain curve from the histogram, and finding a raw gain using the gain curve and current SNR.

9 Claims, 5 Drawing Sheets

(56) References Cited

U.S. PATENT DOCUMENTS

| | | | | |
|---|---|---|---|---|
| 2016/0086618 | A1* | 3/2016 | Neoran | H04M 9/08<br>704/205 |
| 2016/0087658 | A1* | 3/2016 | Weissman | H04B 1/10<br>455/78 |
| 2017/0213539 | A1* | 7/2017 | Magrath | G10K 11/178 |
| 2017/0236526 | A1 | 8/2017 | Choo et al. | |
| 2017/0337932 | A1* | 11/2017 | Iyengar | G10L 21/0208 |
| 2017/0365275 | A1* | 12/2017 | Lee | G10L 21/0364 |
| 2018/0102135 | A1 | 4/2018 | Ebenezer | |
| 2018/0122399 | A1* | 5/2018 | Janse | G10L 21/0232 |

* cited by examiner

METHOD AND AUDIO NOISE SUPPRESSOR USING NONLINEAR GAIN SMOOTHING FOR REDUCED MUSICAL ARTIFACTS

BACKGROUND

Many communication channels are noisy; this channel noise is added to intended signals and transmitted to a receiver. Further, many communications devices, including cell phones, are used in noisy environments such as crowds, cars, stores, and other places where background music or noise exists; background noises are often picked up by microphones and are effectively added to the intended voice signal and, unless suppressed at the transmitting device, are transmitted to the receiver.

When either or both channel noise or background noise reaches a receiver, this noise can impair intelligibility of intended voice signals unless a noise suppressor is used.

A typical communications system 200 in which an audio noise suppressor may be used is illustrated in FIG. 2. Audio from a human speaker 202 and background noise sources 204 are picked up by a microphone 206, audio from microphone 206 may be processed by a noise suppressor 208 before being transmitted by transmitter 210 into channel 212. Channel noise may be injected into channel 212 by channel noise sources 214, where channel noise may add to a transmitted signal and received by receiver 216 to provide a noisy signal that may be processed by noise suppressor 218 before driving a speaker 220 and being presented to a listener 222.

A conventional noise suppressor 100 (FIG. 1), useable as noise suppressor 208 at the transmitter end of channel 212 or as noise suppressor 218 at the receiver end of channel 212, receives an audio input 102 into a frequency-domain conversion unit 104. Frequency domain signals are divided into separate signals 108 each representing a frequency band of multiple frequency bands by band extractor 106; these separate frequency band signals are provided to a speech detector 110 that determines from the separate frequency band signals if speech is present in the incoming audio. Each frequency band signal is processed further by a separate per-band unit 112 having a noise estimator 114 and signal-to-noise ratio estimator 116 that provides an estimated signal-to-noise ratio 118 to a gain calculator 120. Gain calculator 120 provides a band-specific gain 122 to a variable gain unit 124 that applies band-specific gain 122 to the separate signals 108 representing that frequency band to provide a band-specific gain-adjusted signal 126. The band-specific gain-adjusted signals 126 are collected by a recombiner 128 and converted by an analog or time domain convertor 130 to either an analog domain or a digital time domain audio output signal 132.

While noise suppressors according to FIG. 1 in systems according to FIG. 2 work well under some conditions of noise from noise sources 204, 214, under other conditions they may prove objectionable "musical" artifacts. These artifacts result from inappropriate gains applied to one or a few frequency bands, such that noise in those bands is amplified, or insufficiently suppressed, when it should not be.

DETAILED DESCRIPTION OF THE EMBODIMENTS

Figure 1:
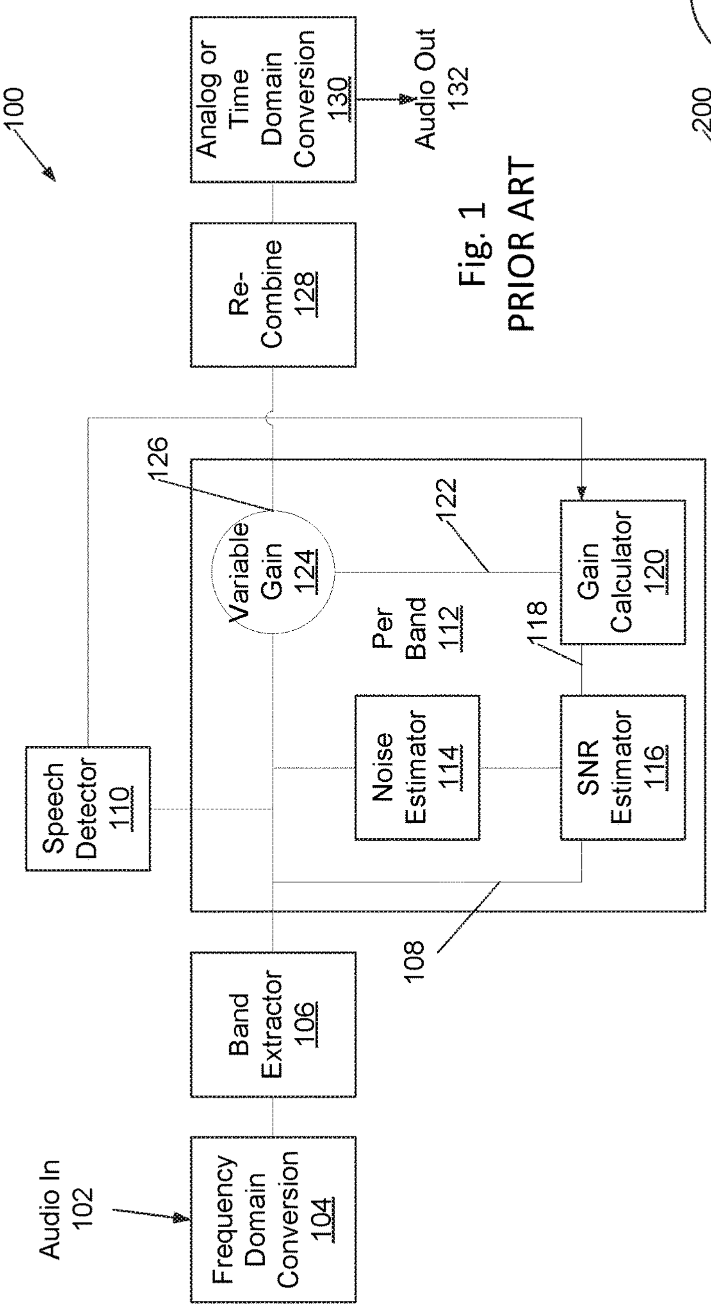
Fig. 1 PRIOR ART
FIG. 1 is a block diagram of a prior-art audio noise suppressor.
Figure 2:
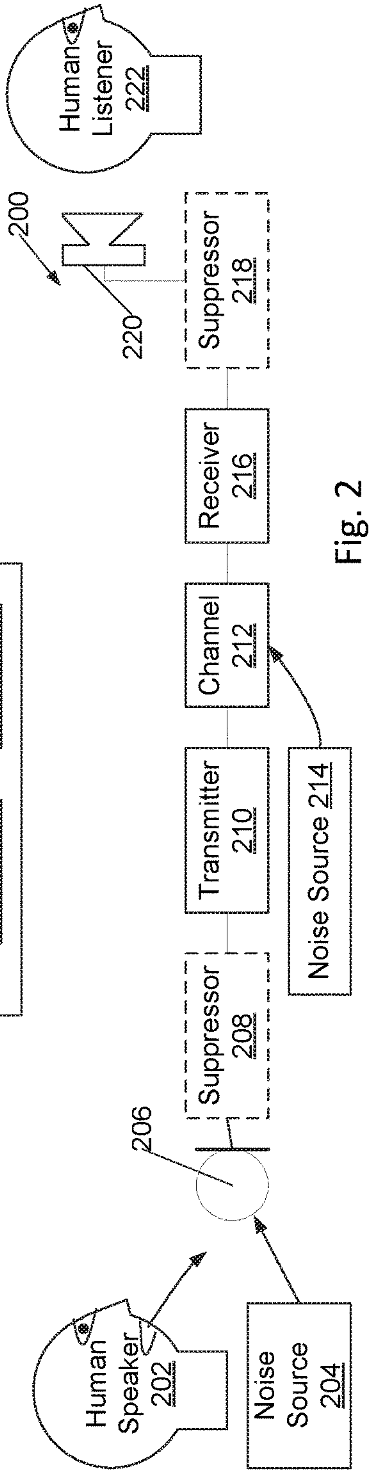
FIG. 2 is a block diagram of a system that may embody one or more audio noise suppressors.

An improved noise suppressor 300 (FIG. 3), useable as noise suppressor 208 at the transmitter end of channel 212 or as noise suppressor 218 at the receiver end of channel 212, receives an audio input 302 into a frequency-domain conversion unit 304. If analog signals are provided to the noise suppressor, they are translated to pulse code modulation (PCM) format with an analog-to-digital converter. In an embodiment, frequency-domain conversion unit 304 performs a Fast Fourier Transform (FFT), Discrete Fourier Transform (DFT), or a Discrete Cosine Transform (DCT) on a timeslice or frame containing multiple sequential samples of input audio in PCM format.

Frequency domain signals from the frequency domain conversion unit 304 are divided into separate signals or signal groups 308 each representing a frequency band of multiple frequency bands by band extractor 306; these separate frequency band signals are provided to a speech detector 310 that determines from the separate frequency band signals if speech is present in the incoming audio and provides a speech-detected flag 312 by looking for patterns of frequencies associated with speech.

These separate frequency band signals are processed further by separate, per-band, gain-derivation and gain-application units 314.

An adaptive gain curve calculation unit 320 and a nonlinear post-filtering unit 322 are provided within each separate per-band gain-derivation and application unit 314. The adaptive gain curve calculation unit 320 adjusts the suppression gain curve from frame to frame based on the input signal power to that adaptive gain curve calculation unit 314 and estimated noise power as determined by a noise estimator 316 of that gain derivation and application unit.

The nonlinear post-filtering unit 322 provides further smoothing using the current raw gain computed for the current frame and recent previous raw gains from the gain curve calculation unit 320. It assumes raw gains are corrupted by noise and thus computes smoothed gains so smoothed gain for a particular frequency band is a nonlinear combination of the current gain and gains determined in prior timeslices.

Adaptive Gain Curve

The input instantaneous signal power and noise power estimate, denoted as $\sigma_Y^2(n, k)$ and $\sigma_N^2(n, k)$, where n and k are the frame index and frequency band index, are used in the SNR estimator 318 of the adaptive gain curve calculation unit 320 to compute the signal-to-noise ratio (SNR) for the current frame. In describing the computation, we omit k, the frequency band index, in the following equations for convenience. The current SNR is $$\xi(n)=10 \log 10(\sigma_Y^2(n)/\sigma_N^2(n)) \quad (1)$$

and is used to update the SNR histogram in SNR histogram unit 324 for noise-only periods determined by speech detector 310. We discretize the range of $\xi(n)$ into Q intervals equally spaced between $\xi_{min}$ and $\xi_{max}$. In a particular embodiment, $\xi_{min}$ and $\xi_{max}$ are 0 and 6, respectively.

The values of the histogram of all the current and recent past SNRs are initialized to 1/Q. The probabilities of all bins of the histogram when there is no speech for the current frame is $$p_\xi(n, i) = \begin{cases} 1 - \alpha_\xi + \alpha_\xi p_\xi(n-1, i), \text{ if } \xi(n) \text{ falls within the } i-th \text{ invertal} \\ \alpha_\xi p_\xi(n-1, i), \text{ otherwise} \end{cases} \tag{2}$$

for i=1, 2, . . . Q, where $\alpha_\xi$ is a constant controlling how rapidly we update the histogram, in an embodiment $\alpha_\xi$ is 0.98. Since the sum of the histogram equals one, we use it as an approximated probability distribution of the SNR when there is only noise. For $\xi(n)$ less than $\xi_{min}$ or greater than $\xi_{max}$, we skip updating the histogram.

The histogram is used to derive a gain curve starting from 0 and increasing monotonically toward 1, as $\xi(n)$ increases in gain curve updater 326. The histogram alters the curve such that for $\xi(n)$ with high probabilities, the curve increases with a less steep slope whereas for $\xi(n)$ with low probabilities, the slope is steeper. The result is gain changes less rapidly for values of $\xi(n)$ that occur more frequently and thus reducing the overall fluctuations of the gains over time.

Letting raw gain be $g_R$ (n), we use a parameterized mapping function, that maps instantaneous SNR $\xi(n)$ to $g_R$ (n)

$$g_R(n) = \begin{cases} 1, \text{ if } \xi(n) > \xi_{max} \\ T(p_\xi(n), i), \text{ if } \xi(n) \text{ falls within the } i-th \text{ interval of } p_\xi(n) \\ 0, \text{ if } \xi(n) < \xi_{min} \end{cases} \tag{3}$$

where $T(p_\xi(n), i)$ is a parameterized function defined as $$T(p_\xi(n), i) = \frac{\sum_{k=1}^{i} 1/p_\xi(n, k)}{\sum_{k=1}^{Q} 1/p_\xi(n, k)} \tag{4}$$

Figure 4:
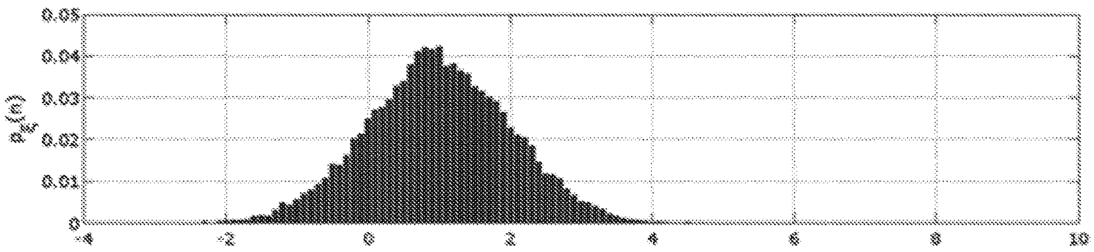
FIG. 4 is a current and past noise magnitude histogram showing a single peak.
Figure 5:
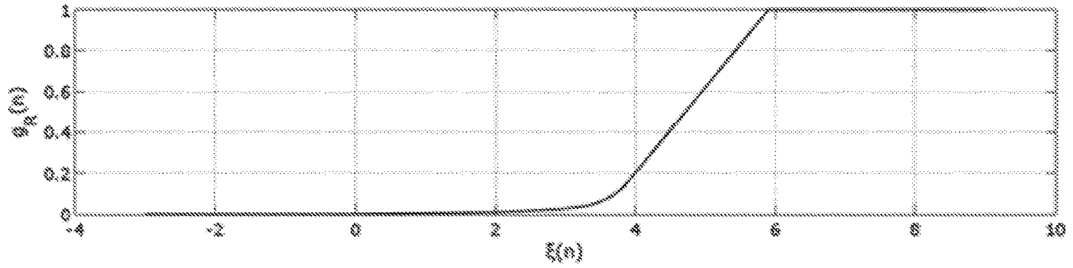
FIG. 5 is a plot of an adapted gain curve derived using the histogram of FIG. 4.

Essentially we use the inverse of the probability of the SNR as the slope of a piece-wise linear curve that starts from 0 and ends at 1. The following figures illustrate two examples of $g_R$ (n) with different SNR distributions. In FIG. 4, it can be seen that $\xi(n)$ is generally centered around 1 dB. As a result, the corresponding gain curve of FIG. 5 has smaller slope in this region compared to other areas, e.g., 4 to 6 dB.

Figure 6:
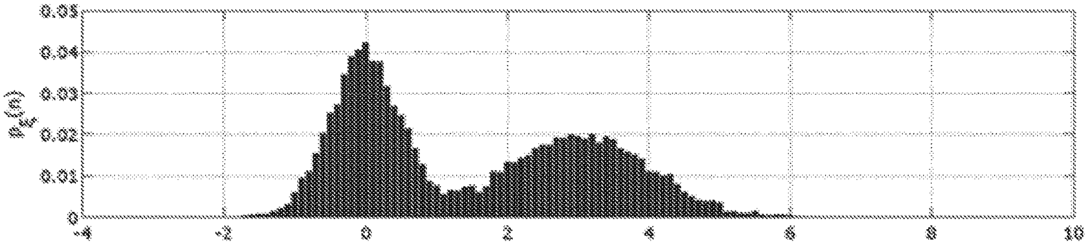
FIG. 6 is a current and past noise magnitude histogram showing two peaks.
Figure 7:
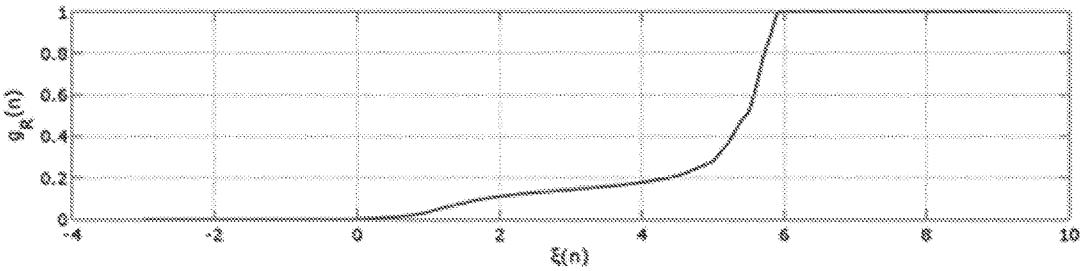
FIG. 7 is a plot of an adapted gain curve derived using the histogram of FIG. 6.
Figure 8:
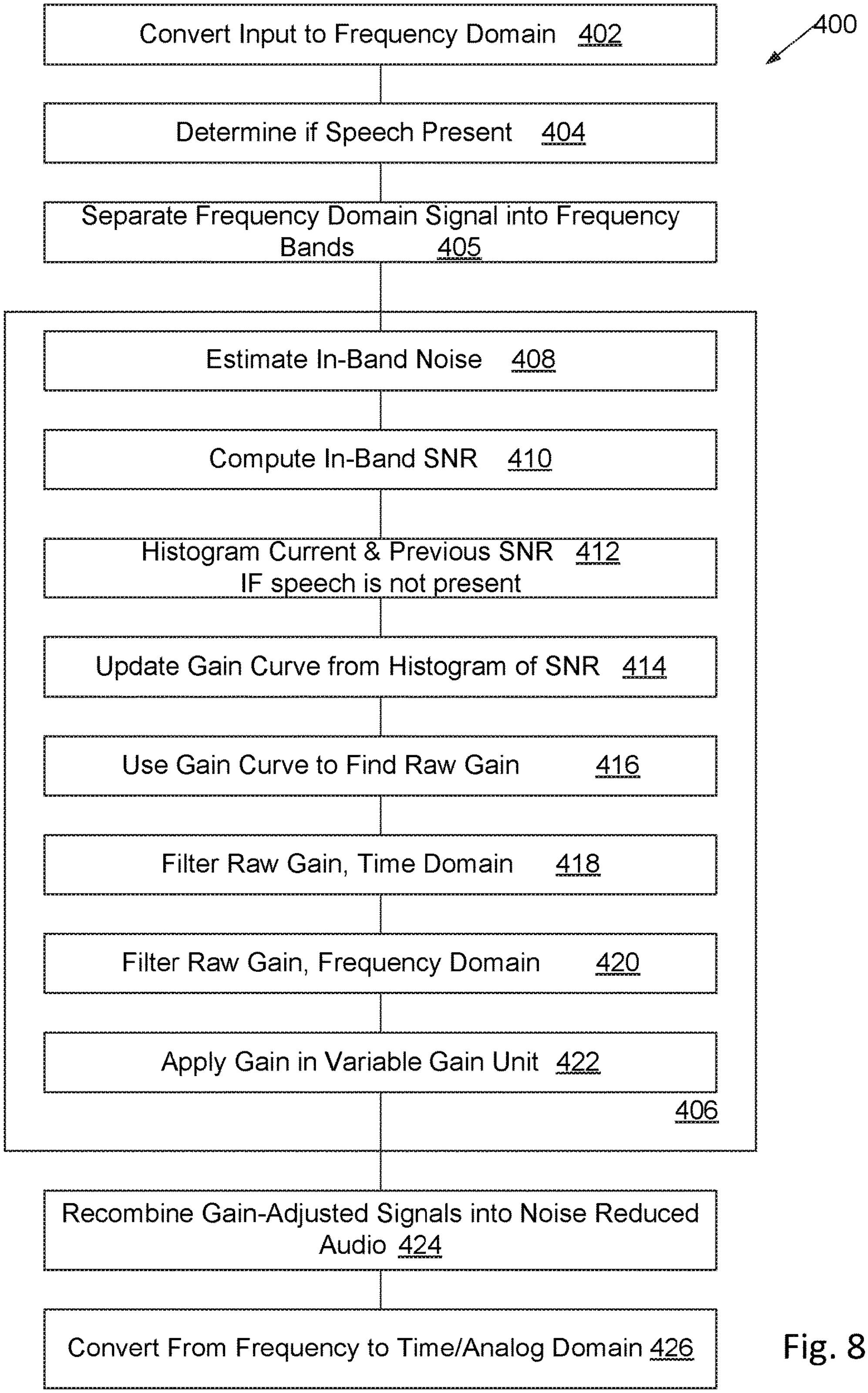
FIG. 8 is a flowchart of a method of reducing noise in a communications system.

In an example gain curve where there are two peaks in the probability distribution of SNR, as shown in FIG. 6, the gain curve adapts to have two flat areas around 0 dB and 3 dB, respectively, as shown in FIG. 7.

The updated gain curve is applied to the current-frame SNR in a raw-gain finder 328, and past raw gains are save in a gain history buffer 330.

Nonlinear Post Filtering

Once the current and historical raw gains are computed, we denote them $g_R$ (n). We further smooth the current gain $g_I$ in gain smoother 340 using historical gain values in history b buffer 330; the gain smoother 340 is essentially a low-pass finite-impulse-response (FIR) digital filter with adaptive weights. In a particular embodiment, we save eight historical raw gains in history buffer 330. We compute weights along the time-axis and calculate an intermediate gain $g_I(n)$ as $$g_I(n) = \sum_{i=0}^{T-1} w_T(i) g_R(n-i) \tag{5}$$

i.e., $g_R$ (n) is a weighted sum of the current and past gain values. To determine the weights $w_T(i)$, we use:

$$w_T(i) = Z_w \exp\left(\frac{-|g_R(n) - g_R(n-i)|}{\gamma_T}\right) \exp(-\gamma_S) \tag{6}$$

where $\gamma_T$ and $\gamma_s$ are predefined constants and $Z_w$ is a normalization factor defined as:

$$Z_w = \sum_{i=0}^{T-1} \exp\left(\frac{-|g_R(n) - g_R(n-i)|}{\gamma_T}\right) \exp(-\gamma_S). \tag{7}$$

Eq. (6) shows that we would put more weight on recent past gains. We also use time decay $\exp(-\gamma_s)$ to make sure we emphasize recent gains over older ones. In an embodiment $\gamma_T$ and $\gamma_s$ are 4 and 0.78, respectively. In (5) and (6) we perform a nonlinear filtering using raw gain values on the time-frequency domain plane to provide an intermediate gain $g_I$.

The final smoothed gain $g_O(n)$ is obtained in a multiband gain smoother 342 by filtering each intermediate gain $g_I(n)$ with a predefined filter in frequency domain, using raw gains filtered by prior gain history from the same and adjacent-band gain derivation and application units, as $$g_O(n, k) = \sum_{i=0}^{M-1} g_I(n, i) h(i-k) \text{ for } k = 0, 1, 2 \ldots N-1 \tag{8}$$

where k is the frequency band index. h(i) is a predefined filter having low pass characteristics.

The smoothed gains $g_O$ are then applied to the frequency-domain converted input signal or signal group 308 in a per-band variable gain unit 350 to provide band-specific gain-adjusted, noise-reduced, frequency-domain signals 352.

The band-specific gain-adjusted, noise-reduced, frequency-domain signals 352 are collected by a recombiner 354 into a noise-reduced frequency-domain signal, and converted by an analog or time domain convertor 356 to either an analog domain or a digital time domain audio output signal 358. In an embodiment, analog or time domain converter 356 performs an inverse of the function of frequency domain converter 304.

Figure 3:
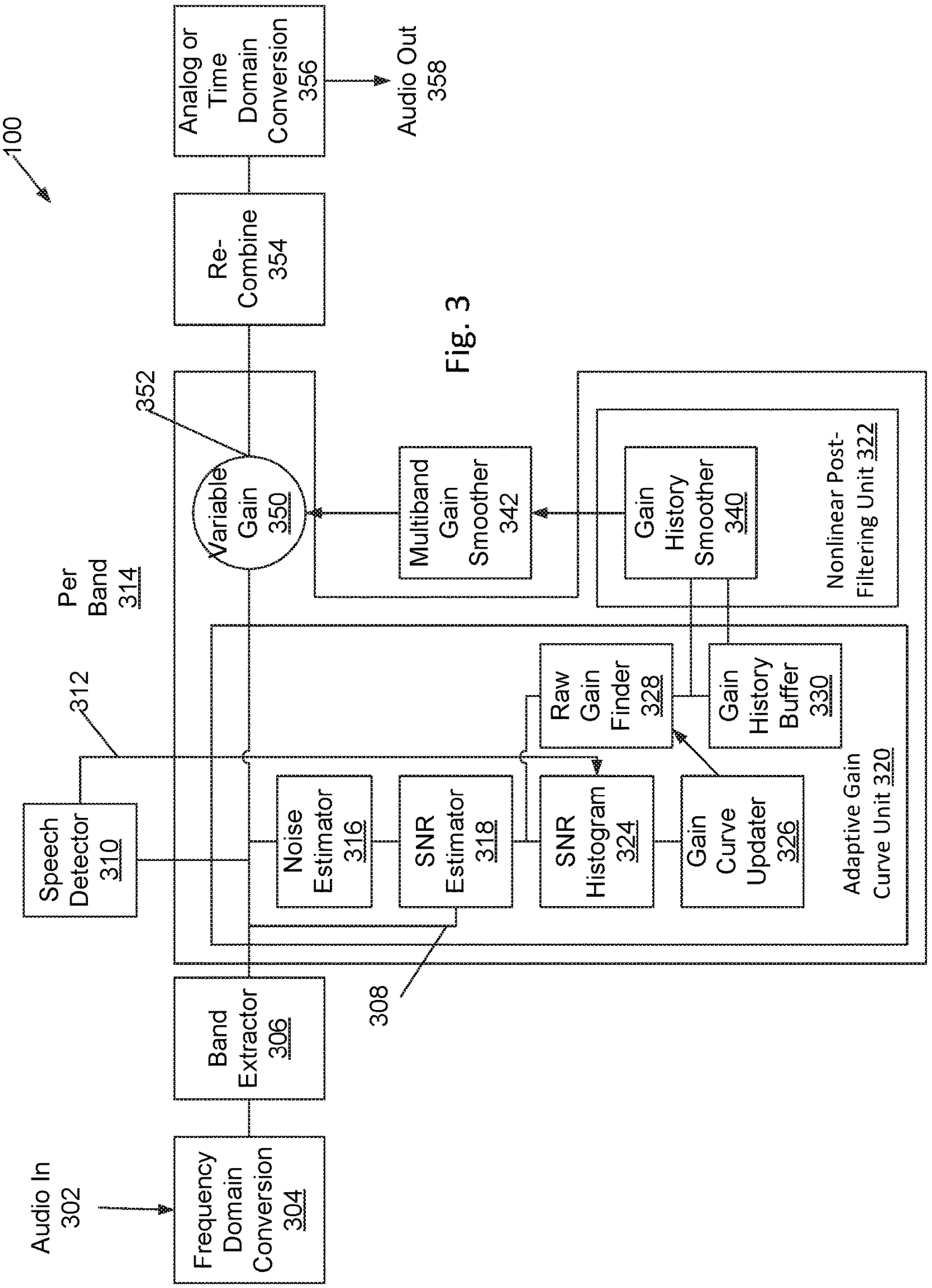
FIG. 3 is a block diagram of an enhanced noise suppressor.

A method 400 (FIG. 4) of reducing noise in a communications system, as implemented by the hardware of FIG. 3, begins by converting 402 incoming analog or digital signals to frequency domain input, and determining 404 if speech is present. The frequency domain input is then separated 405 into separate frequency bands for further processing.

Each frequency band in the frequency domain input is processed separately 406, beginning with estimating 408 the in-frequency-band noise, and computing 410 an in-band signal-to-noise ratio (SNR). Current and recent past SNR's, as determined when speech is not present, are histogrammed 412. The histogram is used to update 414 a gain curve. The gain curve is used 416 with the SNR to find a raw gain. The raw gain is then filtered 418 in time using a finite impulse response digital low-pass filter to give an intermediate gain. The intermediate gain is then filtered 420 against gains determined in adjacent and nearby frequency bands to give a final gain. The final gain is applied 422 in a variable gain unit to produce a noise-reduced signal for this frequency band.

The noise reduced signals from all frequency bands are recombined 424 to generate a noise-reduced audio in frequency domain form, which is then reconverted 426 to time or analog domain.

Combinations of Features

The features herein disclosed may be combined in a variety of ways. Particular combinations anticipated include:

A noise suppressor designated A has a band extractor adapted to separating a frequency domain input by frequency band. The suppressor has at least one per-band unit with a noise estimator coupled to receive a per-band output of the band extractor, a signal to noise ratio (SNR) computation unit coupled to receive an output of the noise estimator and the per-band output of the band extractor and to provide a current SNR, a histogramming unit coupled to provide a histogram of the current and past SNRs, a gain-curve updater configured to derive a gain curve from the histogram of the current and past SNRs, a raw-gain finder configured to use the gain curve and the current SNR to determine a raw gain, a post-filtering unit coupled to receive the raw gain and to provide a filtered gain, and a variable gain unit coupled to receive the per-band output of the band extractor and apply the filtered gain to provide a band-specific gain-adjusted, signal. The noise suppressor also has a combiner configured to combine the band-specific, gain-adjusted, signals into a noise-reduced frequency-domain signal.

A noise suppressor designated AA including the noise suppressor designated A wherein the post-filtering unit of the at least one per-band unit includes a low-pass finite-impulse-response digital filter.

In a noise suppressor designated AB including the noise suppressor designated A or AA the at least one per-band unit further includes a multiband smoother that performs a weighted-average of a current-band and adjacent-band intermediate gains to provide the filtered gain.

A noise suppressor designated AC including the noise suppressor designated A, AA, or AB further including a frequency domain converter adapted to perform a fast Fourier transform (FFT), discrete Fourier transform (DFT) or discrete cosine transform (DCT) to translate an input into the frequency domain input.

A method of noise suppression designated B includes separating a frequency domain input by frequency band into frequency band signals. For each frequency band signal, the method includes estimating noise of the frequency band signal, deriving a signal to noise ratio from the estimated noise and the frequency band signal to provide a current SNR, histogramming the SNR to provide a histogram of the current and past SNRs, updating a gain curve from the histogram of the current and past SNRs, finding a raw gain using the gain curve and the current SNR, filtering the raw gain to provide a filtered gain, and applying the filtered gain to the frequency band signal to provide band-specific gain-adjusted, signals. The method includes recombining the band-specific, gain-adjusted, signals into a noise-reduced frequency-domain signal.

A method of suppressing noise designated BA including the method designated B and wherein filtering the raw gain includes low-pass finite-impulse-response filtering.

A method of suppressing noise designated BB including the method designated B or BA wherein filtering the raw gain of a first frequency band of the frequency bands includes performing a weighted-average of a current-band and adjacent-band intermediate gains.

A method of suppressing noise designated BC including the method designated B, BA, or BB further includes performing a fast Fourier transform (FFT), discrete Fourier transform (DFT) or discrete cosine transform (DCT) to translate an input into the frequency domain input.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A noise suppressor comprising:

a band extractor adapted to separating a frequency domain input by frequency band;

at least one per-band unit comprising:

a noise estimator coupled to receive a per-band output of the band extractor, a signal to noise ratio (SNR) computation unit coupled to receive an output of the noise estimator and the per-band output of the band extractor and to provide a current SNR, a histogramming unit coupled to provide a histogram of the current and past SNRs, a gain-curve updater configured to derive a gain curve from the histogram of the current and past SNRs, a raw-gain finder configured to use the gain curve and the current SNR to determine a raw gain, a post-filtering unit coupled to receive the raw gain and to provide a filtered gain, and a variable gain unit coupled to receive the per-band output of the band extractor and apply the filtered gain to provide a band-specific gain-adjusted, signal; and a combiner configured to combine the band-specific, gain-adjusted, signals from each per-band unit into a noise-reduced frequency-domain signal.

2. The noise suppressor of claim 1 wherein the post-filtering unit of the at least one per-band unit further comprises a low-pass finite-impulse-response digital filter.

3. The noise suppressor of claim 2 the at least one per-band unit further comprising a multiband smoother that performs a weighted-average of a current-band and adjacent-band intermediate gains to provide the filtered gain.

4. The noise suppressor of claim 3 further comprising a frequency domain converter adapted to perform a fast Fourier transform (FFT), discrete Fourier transform (DFT) or discrete cosine transform (DCT) to translate an input into the frequency domain input.

5. The noise suppressor of claim 1 the at least one per-band unit further comprising a multiband smoother that performs a weighted-average of a current-band and adjacent-band intermediate gains to provide the filtered gain.

6. A method of noise suppression comprising:

separating a frequency domain input by frequency band into frequency band signals;

for each frequency band signal, estimating noise of the frequency band signal, deriving a signal to noise ratio from the estimated noise and the frequency band signal to provide a current SNR, histogramming the SNR to provide a histogram of the current and past SNRs, updating a gain curve from the histogram of the current and past SNRs, finding a raw gain using the gain curve and the current SNR, filtering the raw gain to provide a filtered gain, and applying the filtered gain to the frequency band signal to provide band-specific gain-adjusted, signals; and combining the band-specific, gain-adjusted, signals into a noise-reduced frequency-domain signal.

7. The method of claim 6 wherein filtering the raw gain includes low-pass filtering.

8. The method of claim 7 wherein filtering the raw gains of a first frequency band of the frequency bands includes performing a weighted-average of a current-band and adjacent-band intermediate gains.

9. The method of claim 8 further comprising performing a fast Fourier transform (FFT), discrete Fourier transform (DFT) or discrete cosine transform (DCT) to translate an input into the frequency domain input.

* * * * *